Oct. 23, 1945.   J. F. PAGENDARM   2,387,463
TOOL GRINDING MACHINE
Filed June 7, 1943   4 Sheets-Sheet 1
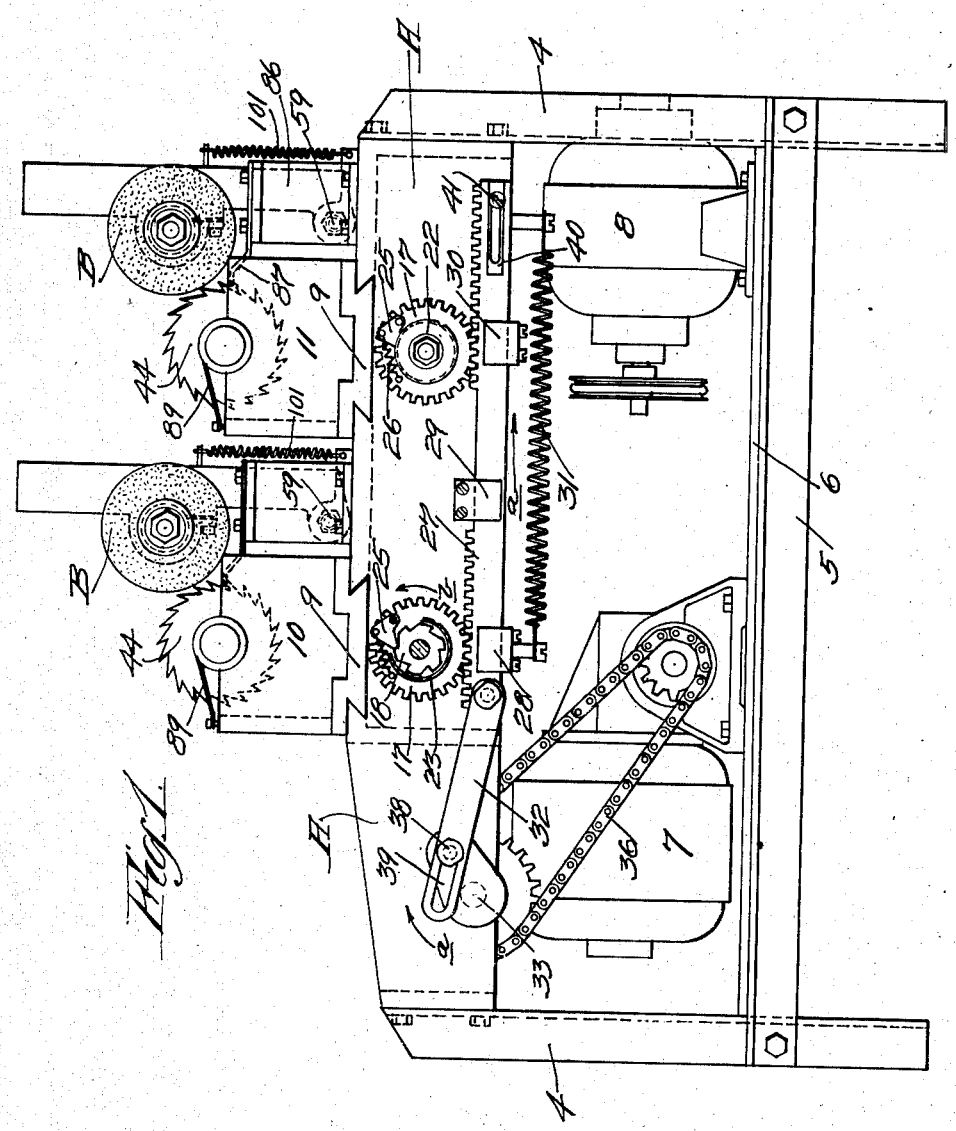
INVENTOR
JOHN F. PAGENDARM.
BY Castberg & Roemer
ATTORNEYS

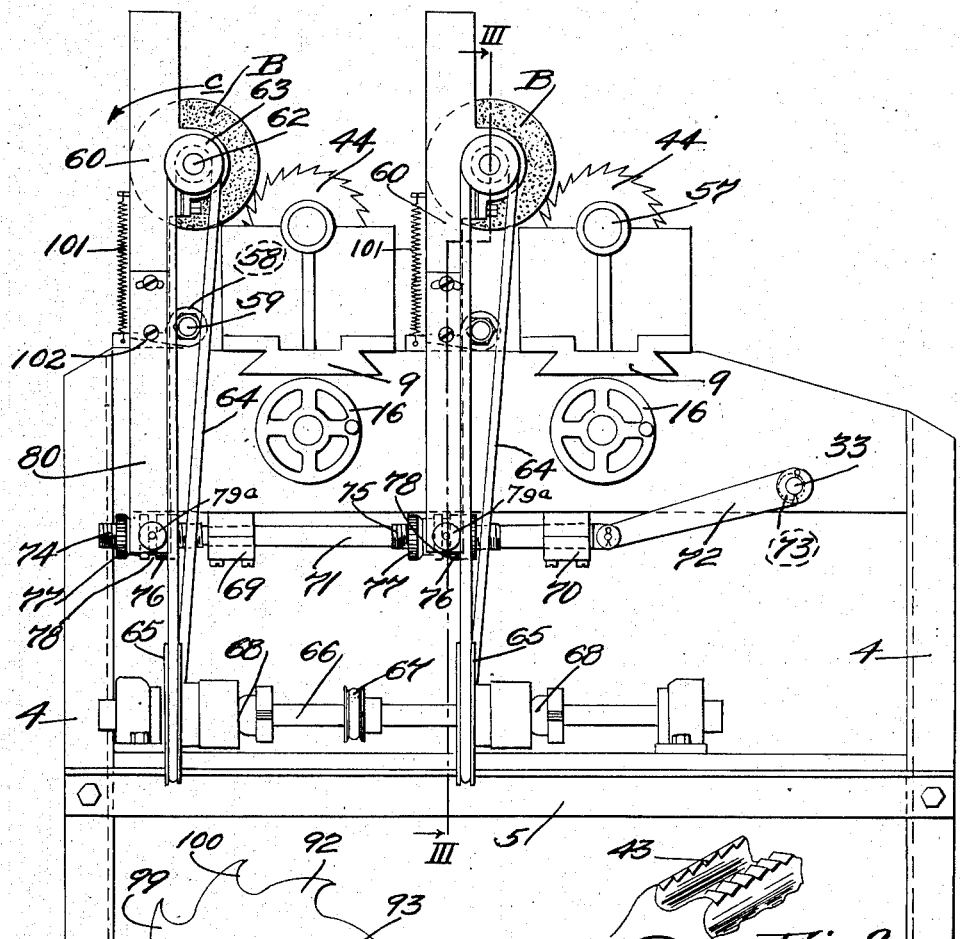

Oct. 23, 1945.  J. F. PAGENDARM  2,387,463
TOOL GRINDING MACHINE
Filed June 7, 1943  4 Sheets-Sheet 3
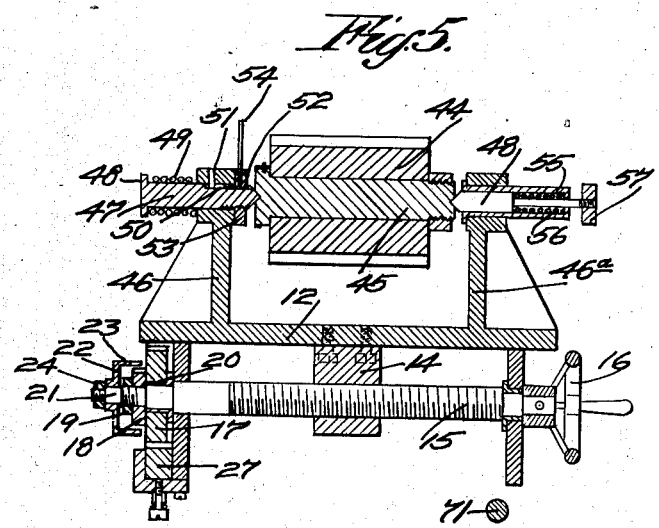
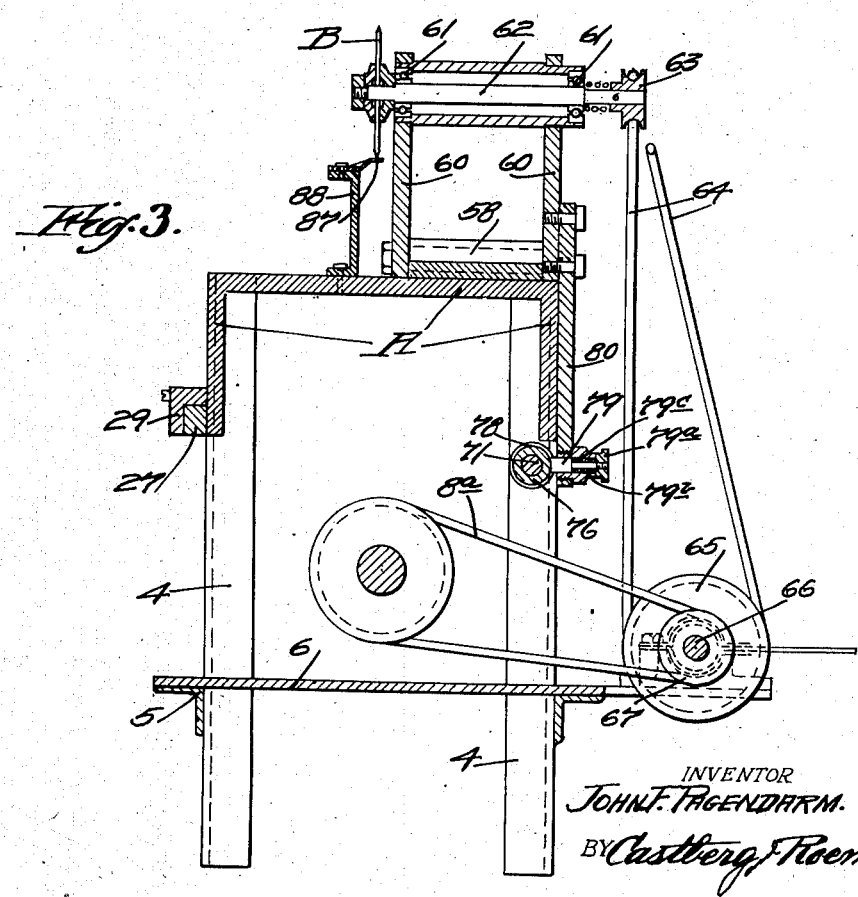
INVENTOR
JOHN F. PAGENDARM.
BY Castberg & Roemer
ATTORNEYS.

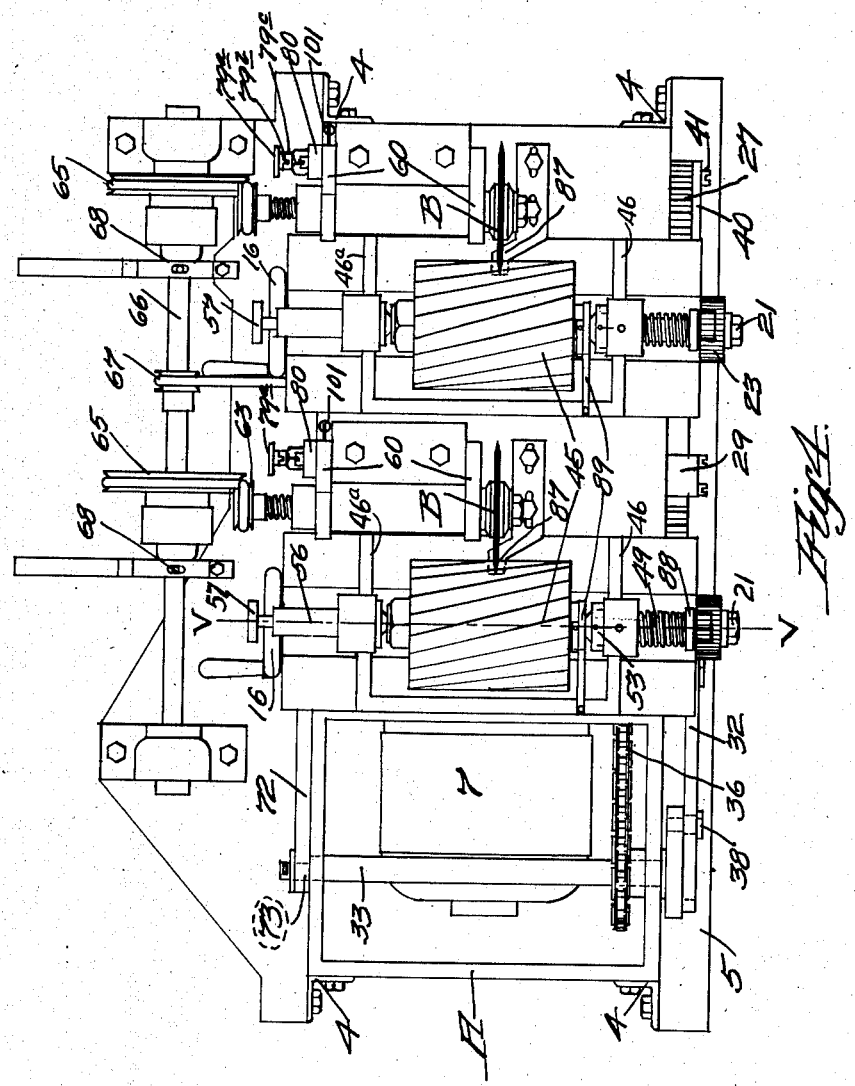

Patented Oct. 23, 1945

2,387,463

UNITED STATES PATENT OFFICE 2,387,463

TOOL GRINDING MACHINE

John Fred Pagendarm, Oakland, Calif.

Application June 7, 1943, Serial No. 489,934

11 Claims. (Cl. 51—98)

This invention relates to a machine for grinding or sharpening tools, and in particular tools provided with a serrated cutting edge.

The object of the present invention is generally to improve and simplify the construction and operation of machines of the character described; to provide a machine which is particularly intended for grinding or sharpening tools provided with a plurality of aligned teeth or a serrated cutting edge; to provide a machine in which the tool being ground is automatically advanced one tooth or serration at a time with relation to a grinding wheel or disc and in which the grinding wheel, while continuously rotating, is automatically moved away from the tool being ground while it is being advanced and then moved back into grinding contact with the tool after advance has taken place; to provide means for adjusting the degree of advance of the tool being ground so that teeth or serrations of varying spacing may be ground; to provide adjustable means for compensating for wear in the grinding wheel or disc that is decreasing the diameter of the wheel; to provide a machine in which is mounted a plurality of grinding wheels or discs so that several tools may be ground simultaneously; and further, to provide means whereby any one of the several grinding wheels or discs may be stopped or rendered inoperative to permit removal or insertion of tools to be ground.

The tool grinding machine is shown by way of illustration in the accompanying drawings, in which:

Fig. 1 is a side elevation of the machine;

Fig. 2 is a side elevation showing the opposite side of the machine;

Fig. 3 is a cross section taken on line 3—3 of Fig. 2;

Fig. 4 is a plan view of the machine;

Fig. 5 is a longitudinal vertical section taken on line V—V, Fig. 4, of one of the carriages wherein the tool to be ground is secured and supported;

Fig. 6 is an end view of a milling cutter to be sharpened;

Fig. 7 is a diagrammatic view showing the manner in which the serrations formed in the teeth of the milling cutter may be staggered; and Fig. 8 is a perspective view of a portion of a milling cutter which is ground to form serrations in its cutting edges.

Referring to the drawings in detail, and particularly to Fig. 1, A indicates an elongated frame supported by end legs 4—4 and longitudinally extending bracing members 5, said bracing members supporting a plate 6 upon which is secured a pair of electric motors 7 and 8. Formed in the upper surface of the frame A and extending cross-wise thereof, are dovetail-shaped guide ways 9—9 in which are slidable a pair of carriages 10 and 11. Each carriage and its feed mechanism is identical in construction; hence, the description of one will suffice. Each carriage is provided with a bottom member 12 (see Fig. 5) to the lower face of which is secured a nut 14. Extending through the sides of the frame A directly underneath each carriage is a feed-screw shaft 15. This shaft is journalled in the sides of the frame A, and one end of the shaft is provided with a hand wheel 16 whereby the feed screws may be manually rotated. On the opposite end of the feed screw is mounted a spur gear 17. Exterior thereof is a ratchet gear 18. This gear is secured to the feed screw shaft by a nut 19, while the gear 17 is freely rotatable on a bushing 20. The feed-screw shaft is extended beyond the nut 19 as shown at 21, and freely journalled on the extension is a disc 22 having an annular flange 23 which encloses the ratchet gear. This disc 22 and flange 23 is secured against removal from the end of the feed-screw shaft by a nut 24, but said nut does not interfere with free rotation of the flanged disc.

Pivotally mounted in the exterior face of the spur gear 18 is a pawl 25. This pawl extends through an opening formed in the flange 23, and as such engages the teeth of the ratchet gear, and it is held in engagement with said teeth by means of a spring 26.

Disposed below the spur gear 17 is a toothed rack bar 27. This is guided and supported by a series of bearing members 28, 29 and 30, secured to the frame A. Reciprocal motion is transmitted to the rack bar in one direction by means of a spring 31, and in the opposite direction by a connecting rod 32. Extending cross-wise of frame A and journalled therein is a drive shaft 33. This shaft is driven from the motor 7 through a reduction gear drive and a chain drive 36. The drive shaft has a crank arm and pin 38 projecting outwardly from one face thereof and this extends through a longitudinally extending slot 39 formed in the connecting rod.

With the motor 7 running, power will be transmitted to drive the drive shaft through the sprocket gears and chain 36 as shown, and the direction of rotation will be that indicated by arrow $a$. During a portion of the rotation of the crank pin 38, it will ride free in the slot 39 until it engages the inner end of the slot. At that point it will impart movement to the rack bar in the direction of arrow $a$, and as the teeth of the rack bar engage the spur gear 17, this will rotate in the direction of arrow $b$ and as the pawl 25 is pivoted on the spur gear and is held in engagement with the teeth of the ratchet gear 23, this will be partially rotated and so will the feed-screw shaft 15 which extends through the nut 14 of the carriage. The degree of rotation of the feed-screw shaft 15 determines the distance the carriage is advanced. This distance may be varied by means of a stop member 40 adjustably secured to the rack bar 27 by a screw 41. When the crank pin 38 has advanced the rack bar the full distance in the direction of arrow $a$, it will commence to recede and the spring 31 will then return the rack bar holding the connecting rod in engagement with the crank pin. This return movement of the rack bar is stopped when the stop member 40 engages the bearing bracket 30. From then on the crank pin will ride outwardly in the slot and the rack bar, and all the mechanism associated therewith will remain at rest until the crank pin again engages the inner end of the slot to impart movement of the rack bar in direction of arrow $a$. Thus, by adjusting the stop member 40, the length or stroke of the rack bar may be adjusted, and the degree of rotation of the feed screw is controlled, thereby determining the amount that the carriage is advanced during each reciprocal stroke of the rack bar.

The carriage is provided for the purpose of supporting the tool to be ground or sharpened. In this particular instance, a milling cutter is illustrated (see Fig. 8). The milling cutter is of a special type as it has serrations or teeth 43 ground in its cutting edges, and the distance the carriage is advanced will accordingly amount to the spacing formed between the teeth or serrations 43. In Fig. 5 it will be noted that the milling cutter indicated at 44 is mounted on an arbor 45, and that this is held between two brackets 46 and 46a by pins 47 and 48. The pin 47 is slidably mounted on the upper end of the bracket 46. It has a knob 48 on its outer end and between this knob and the bracket is interposed a spring 49. The inner end of the pin has a keyway 50 formed therein, and a pin 51 extends into the keyway to prevent rotation of pin 47. The inner end of the pin is exteriorly threaded as shown at 52 and mounted on the threaded portion is a nut 53 which is manually rotated by means of a lever 54 attached thereto. This lever and nut is provided for the purpose of longitudinally adjusting the milling cutter between the brackets 46 and 46a as will hereinafter be described. The pin 48 is mounted in a tubular sleeve 55 and is held in projected position or in engagement with the arbor 45 by an interior compression spring 56. The opposite end of pin 48 is provided with a knob 57 which, when grasped and pulled outwardly, releases the arbor 45 so as to permit quick insertion or removal of the milling cutter indicated at 44.

Referring to Fig. 2, it will be noted that a pair of grinding wheels or discs, generally indicated at B—B are disposed at one side of each carriage. These grinding discs are supported and actuated in the same manner, hence, the description of one will suffice.

In Fig. 6 a bearing is shown at 58. This bearing is secured to the top of the frame A and extends laterally thereof. In the bearing is journalled a shaft 59 and secured to opposite ends of the shaft are a pair of arms 60 in the upper ends of which are journalled, by means of antifriction bearings 61, an arbor 62 to which is detachably secured a grinding disc B. On the opposite end of the arbor is secured a pulley 63 and this is driven by a belt 64 from a pulley 65 secured on a counter shaft 66 extending lengthwise on the machine and substantially from end to end thereof. The counter shaft 66 is provided with a pulley 67, and this is driven from the motor 8 by the belt drive indicated at 8a.

When the machine is in operation, the counter shaft 66 is continuously rotated by the motor 8, and as it is desirable, to connect or disconnect the belt drive 64 from time to time, a clutch 68 is interposed between the counter shaft and the pulleys 65. The pulleys 63 and 65 are mounted at right angles to each other as shown, but by crossing the belt 64, the drive is formed.

Disposed above the counter shaft and supported by bearings 69 and 70 is a shaft 71, to which reciprocal movement is transmitted by a connecting rod 72 and an eccentric 73 which is formed or secured on the drive shaft 33. One end 74 and a portion 75 of shaft 71 is threaded. A sleeve 76 and a cooperating lock unit 77 is mounted on each threaded portion, and as such are longitudinally adjustable on shaft 71. The sleeve 76 is provided with an annular groove 78, and into this groove projects a pin 79 carried by an arm 80 which is secured to or forms an extension of one of the arms 60 (see Figs. 2 and 6). When shaft 71 is reciprocated by eccentric 73 and the connecting rod 72, swinging movement is imparted through sleeve 76 to arm 80 as pin 79 normally extends into the groove 78 formed in the sleeve, and as arm 80 forms an extension of one of the arms 60 which are pivoted as at 59 in the bearing 58, it is obvious that the grinding wheel or disc will be alternately swung to or away from the tool being ground as arms 60 will swing in unison with arm 80.

The swinging movement of the grinding disc B to and away from the tool to be ground must be synchronized with the mechanism which advances the carriage and tool mounted thereon step by step. This is readily accomplished in the present structure as the drive shaft 33 actuates both the carriage advance and the movement of the grinding disc to and away from the disc. That is, shaft 33 has a crank arm and pin 38 at one end which actuates the carriage advance and shaft 33 has an eccentric 73 on the opposite end which actuates the movement of the grinding disc, hence by properly positioning the eccentric 73 with relation to the crank arm and pin 38, the two mechanisms will be so timed that the grinding disc will swing into engagement with the tool to be ground during the rest period of the carriage and will be on its outward movement and away from the tool during the advance movement of the carriage and tool.

Inasmuch as the eccentric 73 imparts a given stroke to shaft 71, and this in turn through sleeve 76 and pin 79 imparts a definite swing or movement of the grinding disc B to and away from the tool to be ground, it is obvious that as the disc wears away or decreases in diameter that the teeth or serrations on the tool being ground would become more and more shallow, and as the teeth or serrations must be of uniform depth, means must be provided for compensating or taking up the wear. This is accomplished in the present structure by sleeve 76 and the lock unit 77, that is, by loosening lock unit 77, sleeve 76 is released, and as such may be rotated and advanced along shaft 71 to take up the wear, and when advanced to a point where the grinding disc reaches proper or predetermined depth on the tool being ground, it is secured by merely tightening the lock unit 77, thus as the grinding disc B wears away and becomes smaller in diameter, the wear is taken up by adjustment of sleeve 76. Furthermore, a grinding disc of practically any diameter within the dimensions of the machine may be employed and may be used until substantially or completely worn away.

The description so far submitted has been directed to one unit of the machine, or in other words, one grinding disc and cooperating carriage. The machine as illustrated, however, disclosed two such units and obviously the frame A may be extended longitudinally to carry as many more units as may be desired. Such as arrangement of identical units might be considered as mere duplication, but it is nevertheless essential where numerous identical or similar tools are being used and require constant care and resharpening. That is, it is desirable to be able to grind or sharpen two, three or more tools at the same time as it is obviously time saving and reduces labor and cost. The sharpening or grinding of several tools at the same time presents certain problems, for instance, one tool may be nearing completion, and another may be half way finished, and a third may just have been started, and so on; hence, when the first tool is finished, it must be removed and another tool to be sharpened inserted. When removing or inserting a tool in one of the units, it is not desirable to stop the whole machine, therefore mechanism is provided for stopping operation of that unit only in which the tool is being removed or inserted while the other units continue to operate. First of all, when stopping a unit, clutch 68 of that unit is disengaged, thereby stopping rotation of the grinding disc. Next pin 79 is pulled outwardly by grasping knob 79a and pulling it outwardly. This causes disengagement with sleeve 76 and swinging movement of the grinding disc to and away from the tool is stopped. Pin 79 is normally retained in engaged position as the knob 79a has a lug 79b which enters a notch in sleeve 79c, but when the knob 79a is grasped and pulled outwardly and then rotated a half turn, the lug engages the end of the sleeve and thereby retains pin 79 in disengaged position. The mechanism which imparts step by step advance movement to the carriage must also be stopped. This is accomplished by merely grasping flange 23 of disc 22 and rotating it a half revolution in the direction of arrow b. This rotation of the disc causes the flange 23 to engage the under side of pawl 25 and raise it out of engagement with the teeth of the ratchet gear 18. The point of the pawl when raised will ride on the exterior surface of flange 23 and when a half turn has been made, the point of the pawl drops into a notch 23a. It is thus held out of engagement with the ratchet gear, and advance of the carriage is stopped. The tool 44 (see Fig. 5) may now be removed by pulling onwardly on knob 57. The arbor 45 is taken out of the finished tool and placed in the next tool to be ground. This is then placed in the carriage and handwheel 16 is grasped and rotated to actuate feed screw 15 and thereby return the carriage to starting position. Disc 22 is now rotated a half turn or until the pawl drops through the opening in flange 23 so as to again engage the ratchet teeth and start the step by step advance of the carriage. Knob 79a is next grasped and rotated until its lug drops into the slot in sleeve 79c, thereby permitting pin 79 to engage sleeve 76 and start movement of the grinding disc to and away from the tool and finally by engaging clutch 67, the drive to the grinding disc is completed and the unit which was disconnected is again in operation.

The milling cutter shown in the present instance is about five or six inches long. In milling cutters of this length the teeth 85 are usually positioned on an angle with relation to the longitudinal axis of the cutter or are helically disposed. It is accordingly necessary to partially and gradually rotate the cutter as it is being advanced step by step with relation to the grinding disc as the movement of the carriage on which the tool is mounted is a straight line movement cross-wise of the frame A. To accomplish this partial and gradual rotation, a pedestal 86 is secured to the top of frame A adjacent the grinding disc. Supported by the pedestal is a finger 87 which projects toward the tool and engages the forward face 88 of one of the teeth of the milling cutter or tool to be ground. The tool, or rather the arbor 45, extending therethrough is held between the pointed ends of the pins 47 and 48 (see Fig. 5) and as such, the arbor and tool may rotate, but rotation is limited to a gradual rotation as one of the teeth of the cutter or tool engages the finger 87 and contact is maintained as the carriage and tool are advanced step by step by means of a spring or rubber band 89 wound about and secured to the arbor at one end and to the frame as at 90 at the opposite end. The pull of the rubber band will rotate the arbor and tool, but as one tooth of the tool contacts finger 87, the rotation will be only a fraction of one revolution during the entire travel of the carriage, the amount or degree of rotation depending of course upon the helical pitch of the teeth or their angular position with relation to the longitudinal axis of the tool.

The machine shown in the present instance is particularly designed to sharpen milling cutters of the type shown in Figs. 6 to 8 inclusive. When the teeth of the milling cutter are sharpened by the grinding disc, a serrated edge is formed as shown at 48 of Fig. 8. This serrated edge when formed on each tooth causes the milling cutter to cut exceedingly fine or small chips from a metal surface, said small chips being later submitted to a grinding action to reduce the chips to a powder form. This function of the invention is disclosed in my co-pending application entitled "Comminuting apparatus," filed February 1, 1943, Serial Number 474,281. In the present instance, let it be assumed that the spacing between the high points and the serrations is 1/50 of an inch. If that is the case, the chips cut would have a certain width, but by staggering the teeth so that they do not align with each other, it is possible to cut smaller chips. In Fig. 7, the serrations formed along one tooth are indicated by the high points 92. On the tooth behind it, the serrations are staggered 1/3 of the distance between the high points and are indicated at 93. On the tooth behind that again the teeth are staggered 1/3 of the distance, and the high points are indicated at 94. Thus, when the cutter is in actual operation, the effective spacing in the successive cuts will be 1/150 of an inch, hence very materially reducing the size of the chips.

Referring to Fig. 6, let it be assumed that the tooth indicated at 92 has the high points formed thereon, the tooth indicated at 93, the high points indicated at 93, and the tooth indicated at 94, the high points indicated at 94. The tooth shown at 95 will have high points which align with the high points 92. The tooth 96 will have high points which align with the points of the tooth 93 and the tooth 97 will have high points aligning with the high points 94. If there are nine teeth, the tooth indicated at 98 will again align with 92, the tooth 99 will have its points aligning with the points 93 and the tooth 100 with the high points 94. To accomplish this offsetting or staggering of the teeth while grinding, it must be remembered that the grinding disc has no lateral movement, its only movement being to and away from the cutters or tool to be sharpened. It is accordingly necessary to longitudinally adjust the cutter or tool being sharpened in the carriage while it is being ground. Such a longitudinal adjustment is accomplished by the lever indicated at 54 (see Fig. 5). For instance, if this lever assumes a vertical position, let that position take care of the high points or serrations which are to be cut in the teeth 92, 95 and 98. When the teeth 93, 96 and 99 are to be ground or serrated, the lever is swung towards the operator, for instance, ⅙ of a revolution. In doing so, it causes the pin 47 to advance the arbor against the spring held pin 48, a distance equal to ⅓ the space between the high points 92. Thus, the teeth 93, 96 and 99, when ground will have the high points 93 and when they are ground, the lever 54 will be moved another ⅙ of a revolution and the arbor and tool will again be shifted so as to cause the teeth 94, 97 and 100 to be ground in such a manner that the serrations or high point will assume the staggered position indicated at 94 in Fig. 7.

The milling cutter, before being subjected to grinding, has teeth of the shape shown in Fig. 6, but when the serrations are ground along the edge of the teeth, the cutter will assume the shape or appearance shown in the fragmentary perspective view (see Fig. 8). The teeth may be staggered or not, as desired.

The machine is simple in construction, and when a unit is started, the grinding mechanism takes place automatically as the grinding disc is moved to and away from the tool automatically and the carriage supporting the tool is moved step by step automatically. When a tooth has been ground from end to end, the operator merely disconnects pin 79 from its sleeve 76. In so doing, he stops movement of the grinding disc to and away from the tool. In fact when the pin 79 is retracted, a spring indicated at 101 (see Fig. 2) pulls arms 60 which carry the grinding disc in the direction of arrow c until a stop shoulder indicated in dotted lines at 102 is engaged and the arms will remain in this position until pin 79 is again engaged. During that period the operator merely grasps the handwheel 16 and by rotating it manually returns the carriage to starting position. At this point the cutter moves out of engagement with the guide finger 87, and as the serrations are to be staggered, the operator permits the tool to be rotated the distance, say of three teeth, and then again reverses the direction of the handwheel so as to bring the cutter back into engagement with the finger. When this is accomplished, he again engages the pin 79 and motion of the grinding disc to and away from the tool commences. This will continue until the entire length of the tooth is serrated when it must again be returned by the handwheel 16 and then to reset for the next operation. When all the teeth of the tool have been ground, it is removed by stopping that unit as previously described.

Two grinding or sharpening units are shown in this instance, but obviously one or two or more may be employed. All of them may be operated simultaneously and any one of them may be stopped to remove or insert a tool to be ground, and while the machine is particularly designed for grinding milling cutters having teeth of the shape shown in Fig. 8, it is obvious that many other types of tools having uniformly spaced teeth or serrations may be ground without departing from the spirit of the present invention.

Having thus described my invention, what I claim and desire to secure by Letters Patent is:

1. In a machine of the character described, a frame, a carriage to receive and secure a multitoothed tool to be ground, a grinding wheel disposed at one side of the carriage and the tool mounted thereon, a drive shaft journalled in the frame, a crank on the drive shaft, means actuated by said crank for advancing the carriage and tool to be ground step by step a distance equal to the spacing between the teeth on the tool to be ground and for maintaining the carriage and tool at rest between each step by step movement, an eccentric on the drive shaft, and means actuated by said eccentric for imparting movement to the grinding wheel toward and into contact with the tool to be ground during the rest period of the carriage and away from the tool during advance movement of the carriage and tool.

2. In a machine of the character described, the combination with the frame and the carriage mounted thereon, of a nut secured to the carriage, a threaded feed screw extending through the nut and journalled in the frame, a gear freely rotatable with relation to the feed screw, a ratchet gear secured to the feed screw, a pawl pivoted on the gear and engageable with the ratchet gear, a toothed rack bar engaging the gear, a drive shaft, a crank thereon, a connecting rod connected at one end to the rack bar, the opposite end of said rod having an elongated slot formed therein through which the crank extends, said crank engaging one end of the slot and through the connecting rod imparting reciprocal movement to the rack bar in one direction and rotation to the gear in one direction and through the pawl causing rotation of the ratchet gear and feed screw to advance the carriage, and a spring connected to the rack bar to impart reciprocal movement thereto in an opposite direction and reversing the rotation of the gear so as to permit the pawl to ride free over the ratchet gear and the carriage to remain at rest, said crank moving freely in the slot during said reverse movement of the rack bar.

3. In a machine of the character described, the combination with the frame and the carriage mounted thereon, of a nut secured to the carriage, a threaded feed screw extending through the nut and journalled in the frame, a gear freely rotatable with relation to the feed screw, a ratchet gear secured to the feed screw, a pawl pivoted on the gear and engageable with the ratchet gear, a toothed rack bar engaging the gear, a drive shaft, a crank thereon, a connecting rod connected at one end to the rack bar, the opposite end of said rod having an elongated slot formed therein through which the crank extends, said crank engaging one end of the slot and through the connecting rod imparting reciprocal movement to the rack bar in one direction and rotation to the gear in one direction and through the pawl causing rotation of the ratchet gear and feed screw to advance the carriage, a spring connected to the rack bar to impart reciprocal movement thereto in an opposite direction and reversing the rotation of the gear so as to permit the pawl to ride free over the ratchet gear and the carriage to remain at rest, said crank moving freely in the slot during said reverse movement of the rack bar, and an adjustable stop member limiting reciprocal movement of the rack bar and thereby the amount of advance of the carriage.

4. In a machine of the character described, the combination with the frame and the carriage mounted thereon, of a nut secured to the carriage, a threaded feed screw extending through the nut and journalled in the frame, a gear freely rotatable with relation to the feed screw, a ratchet gear secured to the feed screw, a pawl pivoted on the gear and engageable with the ratchet gear, a toothed rack bar engaging the gear, means for imparting reciprocal movement to the rack bar to impart oscillating movement to the gear whereby when the gear oscillates in one direction the pawl engages the ratchet gear and rotates the feed screw to advance the carriage, oscillation of the gear in the opposite direction permits the pawl to ride free over the ratchet gear and the carriage to remain at rest, a disc freely rotatable on the feed screw, an annular flange on said disc enclosing the ratchet gear, said flange having an opening formed therein through which the pawl extends to engage the ratchet gear, said disc and flange when manually rotated engaging and raising the pawl out of engagement with the ratchet gear and retaining the pawl out of engagement.

5. In a machine of the character described, a frame, a carriage to receive and secure a multi-toothed tool to be ground, an arm pivoted on the frame at one side of the carriage, a grinding wheel journalled in said arm, a drive shaft, means actuated by the drive shaft for imparting a step by step movement to the carriage and for maintaining the carriage at rest between each step by step movement, a shaft mounted for reciprocal movement on the frame, means for imparting the reciprocal movement of the shaft to the pivoted arm to move the grinding wheel to and away from the tool to be ground during the rest period of the carriage, and an adjustable connection between the reciprocating shaft and the pivoted arm whereby reduction in diameter of the grinding wheel may be compensated.

6. In a machine of the character described, a frame, a carriage to receive and secure a multi-toothed tool to be ground, an arm pivoted on the frame at one side of the carriage, a grinding wheel journalled in said arm, a drive shaft, means actuated by the drive shaft for imparting a step by step movement to the carriage and for maintaining the carriage at rest between each step by step movement, a shaft mounted for reciprocal movement on the frame, means actuated by the drive shaft for reciprocating said shaft, a threaded section on the shaft, a sleeve carried by the threaded section and adjustable longitudinally thereon, a lock nut to secure the sleeve when adjusted, and a connection between the sleeve and the pivoted arm to impart swinging movement to the arm about its pivot so as to move the grinding wheel to and away from the tool to be ground during the rest period of the carriage.

7. In a machine of the character described, a frame, a carriage to receive and secure a multi-toothed tool to be ground, an arm pivoted on the frame at one side of the carriage, a grinding wheel journalled in said arm, a drive shaft, means actuated by the drive shaft for imparting a step by step movement to the carriage and for maintaining the carriage at rest between each step by step movement, a shaft mounted for reciprocal movement on the frame, means actuated by the drive shaft for reciprocating said shaft, a threaded section on the shaft, a sleeve carried by the threaded section and adjustable longitudinally thereon, a lock nut to secure the stem when adjusted, and a releasable connection between the sleeve and the pivoted arm to impart swinging movement to the arm about its pivot so as to move the grinding wheel to and away from the tool to be ground during the rest period of the carriage.

8. In a machine of the character described, a frame, a carriage to receive and secure a multi-toothed tool to be ground, an arm pivoted on the frame at one side of the carriage, a grinding wheel journalled in said arm, a drive shaft, means actuated by the drive shaft for imparting a step by step movement to the carriage and for maintaining the carriage at rest between each step by step movement, a shaft mounted for reciprocal movement on the frame, means actuated by the drive shaft for reciprocating said shaft, a threaded section on the shaft, a sleeve carried by the threaded section and adjustable longitudinally thereon, a lock nut to secure the stem when adjusted, a releasable connection between the sleeve and the pivoted arm to impart swinging movement to the arm about its pivot so as to move the grinding wheel to and away from the tool to be ground during the rest period of the carriage, and means for holding the pivoted arm stationary and in a position where the grinding wheel is away from the tool to be ground when the releasable connection is released.

9. In a machine for grinding a serrated edge on the teeth of a milling cutter tool on which the teeth are helically disposed with relation to the longitudinal axis of the tool, a frame, a carriage on the frame for receiving and supporting the tool, a grinding disc disposed at one side of the carriage and tool, means for imparting a step by step movement to the carriage and tool in the direction of the longitudinal axis of the tool and for maintaining the carriage and tool at rest between each step by step movement, means for imparting movement to the grinding disc to and away from the tool during the rest period, and means for imparting a partial rotation to the tool about its longitudinal axis during the step by step movement of the carriage and tool, said means comprising a finger secured on the frame and engaging one of the teeth on the tool, and spring actuated means for maintaining the tool in engagement with the finger so that the tool will be partially rotated about its axis during longitudinal movement of the carriage.

10. In a machine for grinding a serrated edge on the teeth of a milling cutter tool on which the teeth are helically disposed with relation to the longitudinal axis of the tool, a frame, a carriage on the frame for receiving and supporting the tool, a grinding disc disposed at one side of the carriage and tool, means for imparting a step by step movement to the carriage and tool in the direction of the longitudinal axis of the tool and for maintaining the carriage and tool at rest between each step by step movement, means for imparting movement to the grinding disc to and away from the tool during the rest period, means for imparting a partial rotation to the tool about its longitudinal axis during the step by step movement of the carriage and tool, and means for adjusting the tool longitudinally of the carriage with relation to the grinding disc to cause staggering of the serrations ground in successive teeth.

11. In a machine for grinding a serrated edge on the teeth of a milling cutter tool on which the teeth are helically disposed with relation to the longitudinal axis of the tool, a frame, a carriage on the frame for receiving and supporting the tool, a grinding disc disposed at one side of the carriage and tool, means for imparting a step by step movement to the carriage and tool in the direction of the longitudinal axis of the tool and for maintaining the carriage and tool at rest between each step by step movement, means for imparting movement to the grinding disc to and away from the tool during the rest period, means for imparting a partial rotation to the tool about its longitudinal axis during the step by step movement of the carriage and tool, said means comprising a finger secured on the frame and engaging one of the teeth on the tool, spring actuated means for maintaining the tool in engagement with the finger so that the tool will be partially rotated about its axis during longitudinal movement of the carriage, and means for adjusting the tool longitudinally of the carriage with relation to the grinding disc to cause staggering of the serrations ground in successive teeth.

JOHN F. PAGENDARM.